United States Patent [19]

Grantham

[11] Patent Number: 5,678,614
[45] Date of Patent: Oct. 21, 1997

[54] VAPOR RECOVERY HOSE ASSEMBLY AND VENTURI PUMP THEREFOR

[75] Inventor: Rodger P. Grantham, Springfield, Mo.

[73] Assignee: Vapor Systems Technologies, Inc., Dayton, Ohio

[21] Appl. No.: 544,390

[22] Filed: Oct. 10, 1995

[51] Int. Cl.[6] ............................................. B65B 3/18
[52] U.S. Cl. .................... 141/59; 141/45; 141/46
[58] Field of Search ........................ 141/59, 44–46, 141/301, 302; 417/175, 176, 186; 128/204.25; 137/895, 110

[56] References Cited

U.S. PATENT DOCUMENTS

| | | | |
|---|---|---|---|
| Re. 25,037 | 9/1961 | Brazier | 137/895 |
| 2,307,085 | 1/1943 | Trexler | 417/186 |
| 4,395,201 | 7/1983 | Bron | 417/186 |
| 4,570,686 | 2/1986 | Devine | 141/286 |
| 4,687,033 | 8/1987 | Furrow et al. | 141/59 |
| 4,754,782 | 7/1988 | Grantham | 138/109 |
| 4,922,971 | 5/1990 | Grantham | 141/1 |
| 5,005,613 | 4/1991 | Stanley | 141/45 |
| 5,035,271 | 7/1991 | Carmack et al. | 141/206 |
| 5,040,576 | 8/1991 | Faeth | 141/45 |
| 5,040,577 | 8/1991 | Pope | 141/59 |
| 5,042,537 | 8/1991 | Grantham | 141/59 |
| 5,102,012 | 4/1992 | Foster | 222/40 |
| 5,141,037 | 8/1992 | Carmack et al. | 141/206 |
| 5,148,840 | 9/1992 | Grantham | 141/44 |
| 5,197,523 | 3/1993 | Fink, Jr. et al. | 141/206 |
| 5,285,744 | 2/1994 | Grantham et al. | 141/59 |

*Primary Examiner*—Henry J. Recla
*Assistant Examiner*—Steven O. Douglas
*Attorney, Agent, or Firm*—Roger S. Dybvig; John J. Cheek

[57] ABSTRACT

A vapor recovery hose assembly for connecting a liquid fuel dispensing pump to a liquid fuel dispensing nozzle includes a venturi pump for aspirating liquid fuel condensates from the vapor recovery passageway capable of useful operation over a wide range of the liquid fuel flow rates. At relatively low flow rates, all of the liquid fuel passes through the throat of a venturi tube located within the pump. As the flow rates increase, increasing amounts of the liquid fuel are bypassed around the venturi throat. In a preferred embodiment, the liquid fuel which bypasses the throat of the venturi tube flows through the bore of a hollow, bypass tube that partly surrounds the venturi tube and is spring-biased toward the upstream end of the venturi tube. The bore of the bypass tube has a conical upstream end surface which tapers from a maximum diameter at its upstream end to a minimum diameter intermediate its ends so that the separation between the two tubes increases as the bypass tube is forced further downstream with increases in the liquid fuel flow rate. Other embodiments are also disclosed.

26 Claims, 2 Drawing Sheets

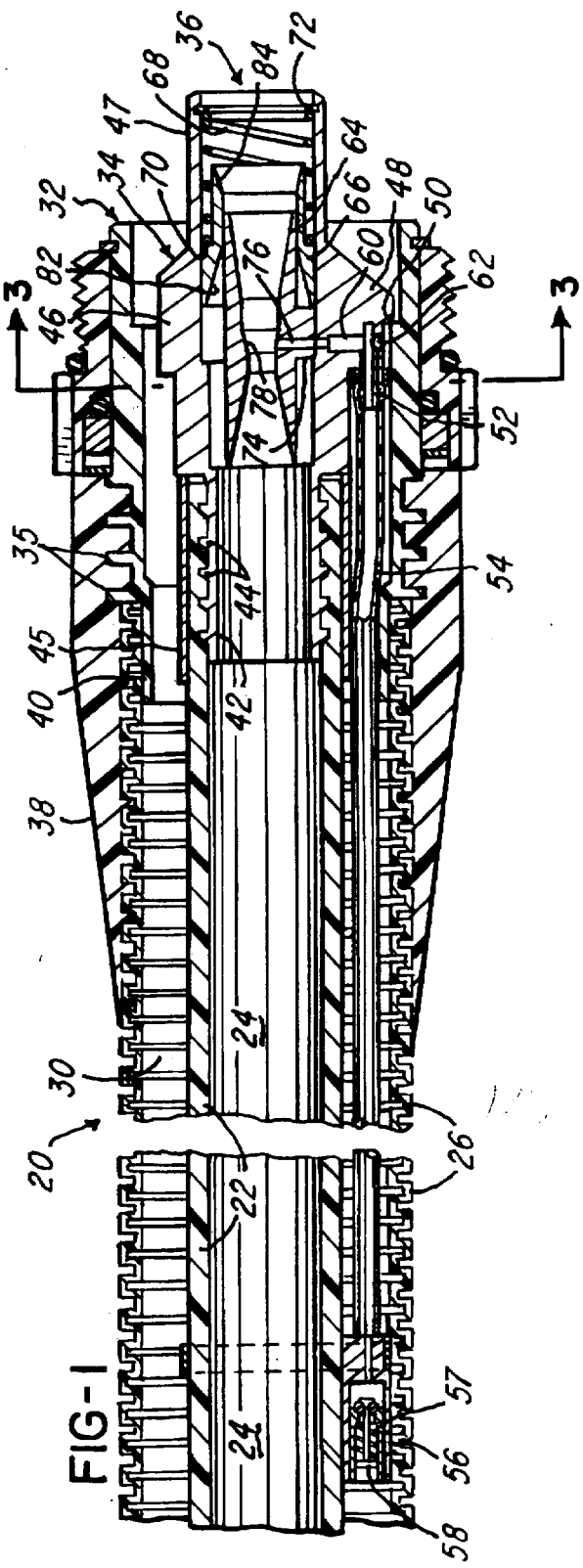

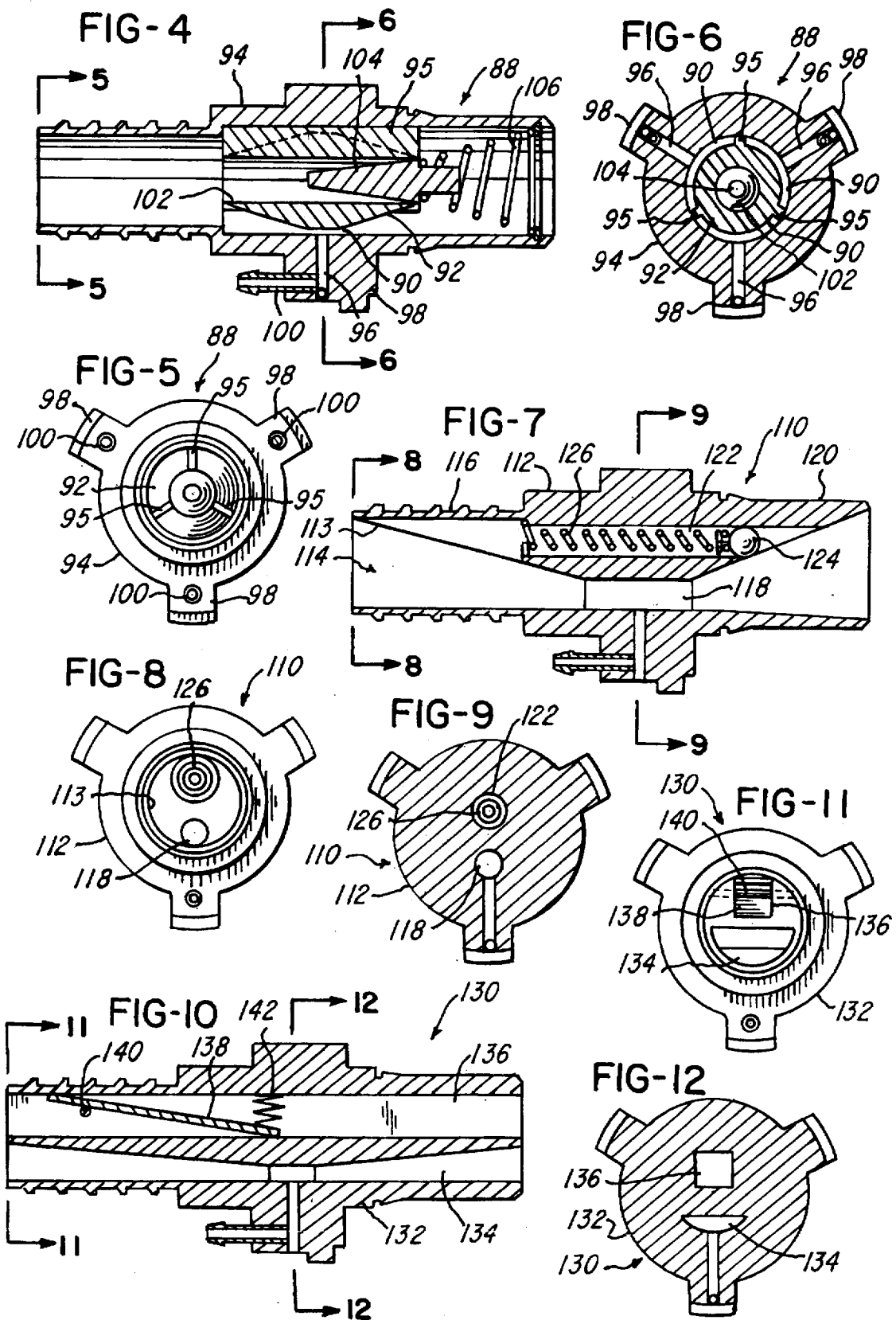

VAPOR RECOVERY HOSE ASSEMBLY AND VENTURI PUMP THEREFOR

FIELD OF THE INVENTION

This invention relates to a vapor recovery hose assembly and a venturi pump for removal of fuel condensates collected in a vapor return passage formed in the hose assembly.

1. Incorporation by Reference

The disclosures of U.S. Pat. Nos. 4,687,033 and 5,035,271 are hereby incorporated by reference herein.

2. Background of the Invention

A typical vapor recovery hose assembly comprises a coaxial hose assembly including a flexible inner hose through which liquid fuel is pumped, a flexible outer hose, and a coupling assembly that includes inner and outer tubular coupling members by which the downstream end of the coaxial hose assembly is connected to a fuel dispensing nozzle. A similar coupling assembly is provided by which the upstream end of the coaxial hose assembly is connected to a fuel dispensing pump. A vapor return passage is formed between the inner hose and the outer hose. A small flexible fuel evacuation tube extends from the downstream coupling downwardly through the vapor return passage into the portion of the vapor return passage which is lowermost when the hose assembly is used for delivering liquid fuel from a fuel supply tank by a fuel pump to a vehicle tank. A suction force is produced within the evacuation tube by means of a venturi pump for removing any liquid fuel which collects or condenses within the lower portion of the vapor return passage in order to keep the passage open. A check valve is provided for preventing fuel from flowing from the inner hose through the evacuation tube and into the vapor return passage.

Various venturi pumps for removing liquid fuel from a vapor return passage have been proposed or provided. Examples are shown in U.S. Pat. Nos. 4,687,033; 5,035,271; and 5,285,744. These are all apparently useful for their intended purpose. However, the range in which they are useful is practically limited by the fact that their venturi pumps are incapable of satisfactory operation over the full range of fuel delivery rates, on the order of four through ten gallons per minute, encountered in various service station or other fuel pumping systems. In the known vapor recovery systems in commercial use prior to the instant invention, the size of the venturi throat is fixed and all of the fuel pumped through the hose assembly flows through the fixed-dimension venturi throat. This severely limits the range of fuel flow rates over which the hose assembly is useful because a venturi nozzle capable of effective operation for use with pumps producing a relatively low flow rate, such as four or five gallons per minute, becomes ineffective for use with pumps that produce a high flow rate, such as eight to ten gallons per minute. The limitations in pumping with a fixed dimension throat are believed primarily due to two factors. A certain minimum fluid flow rate is required to create the necessary pressure differential to cause evacuation of the liquid fuel in the vapor return passage so that flow rates below a threshold rate will not produce evacuation. Accordingly, the pressure drop created by lower flow rates produced by the fuel pump must be adequate to evacuate the vapor return passage. A characteristic of a fixed dimension venturi throat is that the pressure drop through the venturi pump increases exponentially with increasing flow rate. Thus, a fixed dimension venturi usable at lower flow rates may create unusable high pressure differentials at higher flow rates. FIG. 2 of the aforementioned U.S. Pat. No. 4,687,033 shows a venturi pump having a throat which increases in size with increasing flow rates and, therefore, reduces the increase in the pressure differentials as the fuel flow rate increases. However, the range of fuel flow rates over which the pump of the '033 patent is useful is insufficient to work satisfactorily at both low flow rates and high flow rates.

SUMMARY OF THE INVENTION

This invention provides a vapor recovery hose assembly which performs satisfactorily through the complete range of fuel flow rates so that the hose assembly may be used with fuel pumps that pump fuel at a relatively low rate, such as four or five gallons per minute, and at a relatively high rate, such as eight to ten gallons per minute.

In accordance with this invention, the vapor recovery hose assembly has a venturi pump which maintains a highly consistent pressure differential for evacuating a vapor return passage over a substantial range of pumping flow rates, especially from about four to about ten gallons per minute.

More specifically, the venturi pump of this invention has a fixed throat dimension through which a stream of liquid fuel flows at lower fuel flow rates. The flow rate through the venturi throat is maintained reasonably constant at higher fuel flow rates by providing a path of varying dimensions for part of the fuel to bypass the venturi throat. Accordingly, the pressure differentials created by the venturi pump at different fuel flow rates are more uniform than is the case when using conventional venturi pumps with fixed throats and no fuel bypass. Differences in the liquid fuel flow rates within a range from about four to about ten gallons per minute have little effect upon the pressure differential created by the venturi pump so that the pump is effective for removing liquid fuel condensates in the vapor return passage throughout the range of four to ten gallons per minute of fuel flow.

In the preferred practice of this invention, the venturi pump is located within the outer or downstream end of the coaxial hose and extends through a coupling that connects the coaxial hose to the fuel supply nozzle. The venturi pump includes a venturi tube which preferably has a cylindrical downstream outer margin and a throat of fixed dimensions. In addition, the preferred embodiment of a venturi pump in accordance with this invention has a hollow bypass tube that partly surrounds the venturi tube and is spring-biased toward the upstream end of the venturi tube. The bore of the bypass tube has a conical upstream end surface which tapers from a maximum diameter at the upstream end of the bypass tube to a minimum diameter intermediate the upstream and downstream ends of the bypass tube. In operation, at relatively low flow rates the venturi tube and the bypass tube completely plug the passageway in the venturi housing so that the fuel pumped through the inner hose is channeled to flow through the fixed dimension venturi throat. As the fuel flow rate increases, the pressure exerted by the flowing fuel against the bypass tube overcomes the upstream bias exerted by the spring on the bypass tube so that the bypass tube is driven downstream by the fuel and a gap is created between the venturi tube and the bypass tube through which some of the fuel flowing through the inner hose flows around the outside of the venturi tube through the gap separating the venturi tube and the bypass tube. The separation between the two tubes increases as the bypass tube is forced further downstream with increases in the liquid fuel flow rate. This has the effect of reducing the volume, and thereby the velocity, of the liquid fuel that would otherwise flow through the throat of the venturi tube. Accordingly, the pressure differential tending to evacuate the vapor return passage is less than would be produced if the entire volume of the liquid fuel flowed only through the venturi throat. Because the unobstructed size of the gap or bypass opening between the bypass tube and the venturi tube increases with increasing flow rates, increasing amounts of the liquid fuel flow around the outside of the venturi tube rather than through the venturi tube. Accordingly, increases in the rate at which liquid fuel is pumped through the inner hose do not cause corresponding exponential increases in the pressure differential caused by increasing pumping rates when using conventional venturi pumps. Rather, by proper construction of the venturi tube and the bypass tube, the pressure differential produced by the venturi pump of this invention is substantially uniform throughout the range of pumping flow rates from four through ten gallons per minute.

In the preferred embodiment, the bypass tube itself has a throat of restricted and uniform dimension so that fluid flowing through the inner hose at relatively higher flow rates will induce a low pressure area inside the throat of the bypass tube downstream of the venturi tube. It is believed that the low pressure created in the throat of the bypass tube contributes to the reduction of the pressure increases in the throat of the venturi tube at higher flow rates. However, there are other useful constructions of venturi pumps utilizing the venturi-bypass principle of this invention, as will be further described below.

Other features and advantages of the invention will be apparent from the following description, the accompanying drawing and the appended claims.

BRIEF DESCRIPTION OF THE DRAWINGS

FIG. 1 is an axial section of the outer end portion of a vapor recovery hose assembly provided with a venturi pump constructed in accordance with this invention.

FIG. 2 is an axial section of the outer end portion of the vapor recovery hose assembly of FIG. 1 showing a condition of operation of the venturi pump different from that illustrated in FIG. 1.

FIG. 3 is a transverse section of the hose assembly taken along line 3—3 of FIG. 1.

FIG. 4 is a longitudinal cross-sectional view of second embodiment of a venturi pump in accordance with this invention.

FIG. 5 is an end view of the venturi pump of FIG. 4 as viewed in the direction of arrows 5—5 of FIG. 4.

FIG. 6 is a transverse cross-sectional view of the venturi pump of FIG. 4 taken along line 6—6 thereof.

FIG. 7 is a longitudinal cross-sectional view of third embodiment of a venturi pump in accordance with this invention.

FIG. 8 is an end view of the venturi pump of FIG. 7 as viewed in the direction of arrows 8—8 of FIG. 7.

FIG. 9 is a transverse cross-sectional view of the venturi pump of FIG. 7 taken along line 9—9 thereof.

FIG. 10 is a longitudinal cross-sectional view of fourth embodiment of a venturi pump in accordance with this invention.

FIG. 11 is an end view of the venturi pump of FIG. 10 as viewed in the direction of arrows 11—11 of FIG. 10.

FIG. 12 is a transverse cross-sectional view of the venturi pump of FIG. 10 taken along line 12—12 thereof.

DETAILED DESCRIPTION

This invention is shown used with the downstream end of a coaxial, vapor recovery hose assembly, generally designated 20, which includes an extruded polyurethane flexible inner hose 22 having a central passage 24 for delivering liquid fuel from a fuel supply tank (not shown) pumped by dispensing pump (not shown) at the upstream or inner end portion (not shown) of the hose assembly 20 to a dispensing nozzle (not shown) connected to the downstream or outer end portion of the hose assembly 20 shown in FIGS. 1 and 2. Hose assembly 20 further includes a flexible outer hose 26 molded of a suitable plastic, such as polyurethane or HYTREL and having a corrugated configuration in axial cross-section. An annular fuel vapor return passage 30 is formed by and between the inner hose 22 and the outer hose 26. The inner hose 22 and the outer hose 26 may be made substantially as described in U.S. Pat. No. 5,285,744.

A hollow, tubular outer coupling member 32 and a rigid, hollow, tubular inner coupling member 34 are provided at the downstream end of the hose assembly 20 for connecting the hose assembly 20 to the fuel supply nozzle. The outer coupling member 32 is preferably made from a carbon filled nylon material and includes a series of axially spaced ribs 35 which project outwardly into grooves in a molded polyurethane and slightly flexible sleeve or collar 38. The outer coupling member 32 preferably also includes a cylindrical inner end portion 40 which projects into a surrounding downstream end portion of the outer hose 26. The collar 38 is molded around the inner end portion 40 of the outer coupling member 32 and the overlying end portion of the outer hose 26 so that the polyurethane material projects into axially spaced grooves in the outer hose 26 for positively connecting the outer hose 26 to the outer coupling member 32. Here it may be noted that details of the outer coupling member 32 form no part of the instant invention and the outer coupling member 32 is not further described herein. It suffices to state that the outer coupling member 32 may be substantially the same as the outer coupling member 32 shown and described in said U.S. Pat. No. 4,285,744, or it may have various different constructions.

In the preferred practice of this invention, the inner coupling member 34 is constructed to function also as the housing of a venturi pump, generally designated 36. However, as will become evident, the venturi pump 36 optionally could be located upstream of the extreme downstream end of the hose assembly 20, and could, accordingly, have a housing (not shown) separate from the inner coupling member 34.

With reference to FIGS. 1 and 2, the hollow tubular inner coupling member 34, which is preferably machined from aluminum, has an upstream end portion 42 which projects into the downstream end portion of the inner hose 22 and has axially spaced circumferential ribs 44 which project outwardly into the inner hose 22. A cylindrical aluminum ferrule 45 surrounds the downstream end portion of the inner hose 22 and is crimped to compress the inner hose 22 firmly against the upstream end portion 42 of the inner coupling member 34. In addition to its upstream end portion 42, the inner coupling member 34 has an intermediate, larger diameter portion 46 and an intermediate diameter, cylindrical, downstream end portion 47. Functionally, the upstream end portion 42 interfits the downstream end portion of the inner hose 22 so that the throughbore of the inner coupling member defines a continuation of the bore of the inner hose 22 and so that the upstream end portion serves as a fuel inlet to the venturi pump 36. The intermediate coupling portion 46 and the downstream end portion 47 are designed to serve as the venturi housing as well as to provide for a coupling to a dispensing nozzle. In addition, the downstream end portion 47 constitutes a fuel outlet from the venturi pump to the dispensing nozzle (not shown).

With reference also to FIG. 3, the intermediate portion 46 of the inner coupling member 34 has three, uniformly-spaced and outwardly projecting ribs or lugs 48 which engage the inner surface of the outer coupling member 32 adjacent an annular, downstream-facing, internal shoulder 50 formed on the outer coupling member 32. The lugs 48 position the inner coupling member 34 concentrically within the outer coupling member 32. (For reasons which those skilled in the art will be aware, and as described in said U.S. Pat. No. 5,285,744, the lugs 48 also provide electrical continuity between the inner coupling member 34 and outer coupling member 32.)

Three small aluminum tubes 52 project axially through and are press-fitted into respective ones of the lugs 48. The aluminum tubes 52 receive the downstream end portion of respective ones of three flexible evacuation tubes 54 which are held to the aluminum tubes 52 by barbs on the upstream ends of the aluminum tubes 52. The three evacuation tubes 54 extend upstream through the vapor return passage 30 between the inner hose 22 and the outer hose 26 to an evacuation valve assembly 56. The evacuation tube 54 shown in FIGS. 1 and 2 extends upstream through the vapor return passage 30 directly to an evacuation check valve assembly 56 including a valve member 57 which is biased by a spring 58 to close the check valve 56 except when fuel is being pumped through the hose assembly at a rate to cause the venturi pump 36 to create sufficient suction to overcome the bias of the valve spring 58. The other two evacuation hoses 54, which are only shown in FIG. 3, extend partly around the inner hose 22 to the evacuation check valve assembly 56. The downstream end of the small aluminum tubes 52 are in open communication with respective fluid passageways 60 that extend radially through the wall of the inner coupling 34. The outer ends of the radial passageways 60 are closed by ball-like plugs 62 pressed and staked into their outer ends.

The venturi pump 36 comprises, in addition to the housing formed by the inner coupling member 34, an axially-extending, hollow venturi tube 64 within the throughbore of the inner coupling member or housing 34, a bypass tube 66 slidable within the throughbore of the coupling member or housing 34, and a bypass return spring 68 trapped between a forwardly or downstream facing shoulder 70 formed on the bypass tube 66 and the upstream-facing surface of a spring retaining ring 72 held within a groove located within the downstream end portion 47 of the inner coupling 34.

The venturi tube 64 has a cylindrical outer surface throughout its length but for three radially outwardly-extending lugs 74 that have arcuate outer surfaces press fit within the inside surface of the intermediate section 46 of the inner coupling 34. Fluid passageways 76 extend radially through the wall of the venturi tube 64 and its lugs 74 in alignment with passageways 60 in the inner coupling member 34. The bore of the venturi tube 64 tapers conically inwardly from its upstream end toward its midsection and conically outwardly from its midsection to its downstream end. The midsection of the venturi tube 64 has intermediate sections including a throat 78 opening to the radial passageways 60 in the coupling 34. The throat 78 tapers outwardly from its upstream end to its downstream end because it has been found to be important in the design of the particular venturi tube 64 shown in the drawings that the throat 78 have an increasing area from upstream to downstream where it opens to the radial passageway 60 in the inner coupling member 34.

As is evident, the venturi tube 64 has a smaller outer diameter than the internal diameter of at least the portion of the inner coupling member 34 throughbore within which the venturi tube 64 is located. Accordingly, were it not for the presence of the bypass tube 66, liquid fuel flowing through the inner hose 22 could flow both through the throat 78 of the venturi tube 64 and also flow around the outside of the venturi tube 64.

With reference to FIG. 1 and 2, the bypass tube 66 partly surrounds the venturi tube 64 and has a cylindrical, central inner surface 80 intermediate its ends which is slidable relative to the downstream end of the venturi tube 64 so that, when the central inner surface 80 is slidably engaged with the outer surface of the venturi tube 64, liquid fuel is substantially prevented from flowing around the venturi tube 64. Bypass tube 66 also has a generally conical upstream inner surface 82 which tapers from a maximum diameter at the upstream end of the bypass tube 66 to a minimum diameter where it joins to the central inner surface 80, and a generally conical downstream inner surface 84 which tapers from a minimum diameter at its upstream end to a maximum diameter at its downstream end.

As best shown in FIG. 1, when the fuel pump is not operating or is pumping fuel at relatively low flow rates, the venturi tube 64 and the bypass tube 66 completely plug the throughbore through the coupling 34 so that the fuel pumped through the inner hose is channeled to flow through the fixed dimension venturi throat 78. As the fuel flow rate increases, the pressure exerted by the flowing fuel against the bypass tube 66 overcomes the upstream bias exerted by the spring 68 on the bypass tube 66 so that the bypass tube 66 is driven downstream by the fuel and a gap is created between the venturi tube 64 and the bypass tube 66 through which some of the fuel flowing through the inner hose 22 flows around the outside of the venturi tube 64 through the gap separating the venturi tube 64 and the bypass tube 66. The separation between the two tubes increases as the bypass tube 66 is forced further downstream with increases in the liquid fuel flow rate. This has the effect of reducing the volume, and thereby the velocity, of the liquid fuel that would otherwise flow through the throat 78 of the venturi tube 64. Accordingly, the pressure differential tending to evacuate the vapor return passage 30 is less than would be produced if the entire volume of the liquid fuel flowed only through the venturi throat 30. Because the unobstructed size of the gap or bypass opening between the bypass tube 66 and the venturi tube 64 increases with increasing flow rates, increasing amounts of the liquid fuel flow around the outside of the venturi tube 64 rather than through the venturi tube 64. Accordingly, increases in the rate at which liquid fuel is pumped through the inner hose do not cause corresponding exponential increases in the pressure differential caused by increasing pumping rates when using conventional venturi pumps. Rather, by proper construction of the venturi tube 64 and the bypass tube 66, the pressure differential produced by the venturi pump of this invention is substantially uniform throughout the range of pumping flow rates from four through ten gallons per minute.

The bypass tube 66 itself has a throat of restricted and uniform dimension so that fluid flowing through the inner hose at relatively higher flow rates will induce a low pressure area inside the throat of the bypass tube 64 downstream of the venturi tube. It is believed that the low pressure created in the throat of the bypass tube 66 contributes to the reduction of the pressure increases in the throat 78 of the venturi tube 64 at higher flow rates.

FIGS. 1 through 3 illustrate the presently preferred embodiment of this invention. FIGS. 4 through 12 show three other embodiments of venturi pumps constructed in accordance with this invention. In the second embodiment, which is illustrated in FIGS. 4, 5 and 6, a venturi pump assembly 88 is formed to have three venturi throats 90 formed between a central, fixed venturi tube 92 and the inside surface of a venturi housing 94. It will be understood that, as before, the housing 94 is connected to the downstream end of the inner hose of a coaxial hose assembly.

The three venturi throats 90 are mutually separated by axially and radially outwardly extending ribs 95 formed on the venturi tube 92. As before, radial venturi passageways, designated 96, extend through lugs 98 in the housing 94 and open to small aluminum tubes 100 to which are connected flexible evacuation hoses (not shown). A variable bypass of the fuel through the venturi throats 90 is obtained by means of an axial throughbore 102 in the center of the venturi tube 92. When there is no fuel flowing through the coaxial hose assembly, or there is fuel flowing as a relatively slow rate, the throughbore is closed by a conical bypass plug 104 held within the throughbore 102 by a bypass return spring 106. At higher fuel rates, the flowing fuel overcomes the bias of the bypass return spring so that the plug 104 moves downstream of the venturi tube 92, i.e. to the right as viewed in FIG. 4, to produce progressively greater spacings between the venturi tube 92 and the bypass plug 104, to enable progressively greater volumes of fluid fuel to bypass the venturi throats 90.

With reference to FIGS. 7, 8 and 9, a third embodiment of this invention comprises a venturi pump, generally designated 110, comprising a rigid housing 112 machined from a cylindrical block of aluminum having an internal wall 113 shaped to provide a venturi throughbore 114 having an upstream end 116 which tapers inwardly and forwardly toward downstream end to a venturi throat 118 intermediate the upstream and downstream ends of the housing 112, and then tapers outwardly toward its downstream end 120. Thus, the housing 112 defines the venturi throughbore 114 including the venturi throat 118. A variable bypass of the fuel through the venturi throat 118 is obtained by means of an axial bypass bore 122 that extends through the housing wall 113 and closed by a ball valve 124 biased by a spring 126 to close the bypass bore 122. The operation of this third embodiment is apparent from the descriptions of the first and second embodiments.

Referring to FIGS. 10, 11 and 12, a fourth embodiment of a venturi pump, generally designated 130, in accordance with this invention comprises a solid aluminum housing 132 which has a first, venturi throughbore 134 extending axially along its entire length and a second, square bypass throughbore 136 extending its entire length. An upstream end of a metal valve strip 138 is pivoted by a pivot pin 140 to the upstream end of the housing 132. The ends of the pivot pin 140 extend into aligned bores (not shown) in the body of the housing 132. In use, the pivot pin 140 is retained within the pin-receiving bores by the downstream end of the inner hose (not illustrated in FIGS. 10, 11 or 12), which covers the outer ends of the pin-receiving bores. The downstream end of the valve strip 138 is biased to close the bypass bore 136 by a coil spring 142. As before, the operation of this fourth embodiment will be evident from the foregoing description.

Although the presently preferred embodiments of this invention have been described, it will be understood that within the purview of the invention various changes may be made within the scope of the following claims.

Having thus described my invention, I claim:

1. A venturi pump assembly for a liquid fuel vapor recovery hose assembly having an inner hose through which liquid fuel is pumped from a fuel supply tank by a fuel pump at the upstream end of the inner hose to a dispensing nozzle at the downstream end of the inner hose, and said hose assembly further comprising a vapor return passage between said inner hose and an outer hose connected to said fuel pump and to said nozzle and an evacuation fuel return tube located in said vapor return passage through which liquid fuel condensed and accumulated in said vapor return passage may be sucked into the venturi pump and thereby into said inner hose, said venturi pump assembly comprising:

a rigid housing having a throughbore and having an upstream, fuel inlet end and a downstream, fuel outlet end;

means forming a venturi throat within said throughbore through which fuel can flow from its upstream end to its downstream end;

at least one passageway extending from said throat to said evacuation tube;

means providing a bypass within said housing for bypassing fuel around said venturi throat;

closure means for substantially closing said bypass;

means for biasing said closure means into a position relative to said bypass that it substantially prevents fuel from bypassing said throat at lower fuel pumping rates but permits said closure means to move to open said bypass means in response to higher fuel pumping rates.

2. The venturi pump assembly of claim 1 further comprising a venturi pump housing, wherein said means forming said venturi throat is located within said pump housing and formed by internal wall portions of said housing, and wherein said bypass means comprises a bore extending through said housing and formed by internal wall portions of said housing.

3. The venturi pump assembly of claim 2 wherein said closure means comprises a plug member.

4. A coaxial vapor recovery hose assembly comprising an inner hose, an outer hose, and the venturi pump assembly of claim 1.

5. The venturi pump assembly of claim 1 wherein said means forming a venturi throat comprises an internal wall of said housing, and wherein said means providing a bypass comprises a separate bypass bore extending through said housing.

6. The venturi pump assembly of claim 5 wherein said closure means comprises a ball valve.

7. The venturi pump assembly of claim 1 wherein said means providing a bypass comprises a separate bypass bore extending through said housing.

8. The venturi pump assembly of claim 7 wherein said bypass bore has a rectangular cross-section, and wherein said closure means comprises a pivotable closure strip extending across said bypass bore.

9. The venturi pump assembly of claim 1 wherein said means forming a venturi throat is a first means forming a first venturi throat, and further comprising second means forming a second venturi throat within said throughbore downstream of said first means forming a first venturi throat.

10. The venturi pump assembly of claim 9 wherein said second means forming a second venturi throat comprises said closure means.

11. A venturi pump assembly for a liquid fuel vapor recovery hose assembly having an inner hose through which liquid fuel is pumped from a fuel supply tank by a fuel pump at the upstream end of the inner hose to a dispensing nozzle at the downstream end of the inner hose, and said hose assembly further comprising a vapor return passage between said inner hose and an outer hose connected to said fuel pump and to said nozzle and an evacuation fuel return tube located in said vapor return passage through which liquid fuel condensed and accumulated in said vapor return passage may be sucked into the venturi pump and thereby into said inner hose, said venturi pump assembly comprising:

a rigid housing having a throughbore and having an upstream, fuel inlet end and a downstream, fuel outlet end;

means forming a venturi throat within said throughbore through which fuel can flow from its upstream end to its downstream end;

at least one passageway extending from said throat to said evacuation tube;

means providing a bypass for bypassing fuel around said venturi throat;

closure means for substantially closing said bypass; and means for biasing said closure means into a position relative to said bypass that it substantially prevents fuel from bypassing said throat at lower fuel pumping rates but permits said closure means to move to open said bypass means in response to higher fuel pumping rates;

wherein said means forming said venturi throat comprises a venturi tube, wherein said closure means comprises a bypass tube slidably mounted with respect to said venturi tube; and wherein said bypass means comprises mutually-cooperating surfaces of said bypass tube and said venturi tube.

12. A vapor recovery hose assembly for connecting an upstream fuel dispensing pump to a downstream fuel dispensing nozzle, comprising:

an elongate, flexible inner hose having opposite end portions and defining a passage for directing a liquid fuel supply from the pump to the nozzle;

an elongate outer flexible hose surrounding said inner hose and having corresponding opposite end portions, said inner and outer hoses defining therebetween a longitudinally extending annular passage for returning fuel vapor from the nozzle to the pump;

a coupling assembly connecting said hoses to the nozzle, said coupling assembly having internal surfaces defining a cylindrical bore opening to said inner hose and to said nozzle along which fuel may flow from said inner hose to said nozzle;

a longitudinally extending fuel evacuation hose within said annular passage;

a venturi assembly in said cylindrical bore, said venturi assembly comprising:

an axially-extending, hollow venturi tube within said cylindrical bore, said venturi tube having at least one generally radially-extending passageway, said venturi tube having a smaller outer diameter than the internal diameter of at least the portion of the cylindrical bore within which said venturi tube is located so that liquid fuel flowing through said cylindrical bore can flow through the throat of said venturi tube and also flow around the outside of said venturi tube;

said coupling assembly having one or more generally radially-extending passageways each being in fluid communication with one of at said at least one passageway in said venturi tube;

an axially-movable hollow bypass tube extending axially within said cylindrical bore partly surrounding said venturi tube, said bypass tube having:
         i. a central inner surface intermediate its ends which is slidable on the downstream end of said venturi tube and has substantially the same peripheral configuration as the outer surface as the downstream end of said venturi tube so that, when said central inner surface is slidably engaged with said venturi tube, liquid fuel is substantially prevented from flowing between said tubes; and
         ii. a generally conical upstream inner surface which tapers from a maximum diameter at the upstream end of the bypass tube to a minimum diameter where it joins to said central inner surface;

a downstream-facing shoulder within said cylindrical bore; and a spring within said coupling assembly biasing said bypass tube toward the upstream end of said coupling assembly into engagement with said shoulder.

13. A venturi pump for a liquid fuel vapor recovery hose assembly comprising:

a rigid housing having a throughbore and having an upstream, fuel inlet end and a downstream, fuel outlet end;

an axially-extending, hollow venturi tube within said throughbore, said venturi tube having at least one generally radially-extending passageway, said venturi tube having a smaller outer diameter than the internal diameter of at least the portion of the housing throughbore within which said venturi tube is located so that liquid fuel flowing through said throughbore can flow through the throat of said venturi tube and also flow around the outside of said venturi tube;

said housing having one or more generally radially-extending passageways each being in fluid communication with one of at said at least one passageway in said venturi tube;

an axially-movable hollow bypass tube extending axially within said throughbore partly surrounding said venturi tube, said bypass tube having:
      i. a central inner surface intermediate its ends which is slidable on the downstream end of said venturi tube and has substantially the same peripheral configuration as the outer surface as the downstream end of said venturi tube so that, when said central inner surface is slidably engaged with said venturi tube, liquid fuel is substantially prevented from flowing between said tubes; and
      ii. a generally conical upstream inner surface which tapers from a maximum diameter at the upstream end of the bypass tube to a minimum diameter where it joins to said central inner surface;

a downstream-facing shoulder within said throughbore; and a spring within said housing biasing said bypass tube toward the upstream end of said housing into engagement with said shoulder.

14. A venturi pump assembly for a liquid fuel vapor recovery hose assembly having an inner hose through which liquid fuel is pumped from a fuel supply tank by a fuel pump at the upstream end of the inner hose to a dispensing nozzle at the downstream end of the inner hose, and said hose assembly further comprising a vapor return passage between said inner hose and an outer hose connected to said fuel pump and to said nozzle and an evacuation fuel return tube located in said vapor return passage through which liquid fuel condensed and accumulated in said vapor return passage may be sucked into the venturi pump and thereby into said inner hose, said venturi pump assembly comprising:

a rigid housing having a throughbore and having an upstream, fuel inlet end and a downstream, fuel outlet end;

a venturi throat within said throughbore through which fuel can flow from its upstream end to its downstream end;

at least one passageway extending from said throat to said evacuation tube;

a bypass within said housing around said venturi throat through which fuel can flow; and a bypass closure member substantially preventing the flow of fuel through said bypass at lower fuel pumping rates but permitting the flow of fuel through said bypass in response to higher fuel pumping rates.

15. The venturi pump assembly of claim 14 further comprising a venturi pump housing in which said venturi throat is formed, wherein said bypass comprises a bypass bore extending through said venturi pump housing, and wherein said closure member comprises a spring-biased stopper axially-aligned with said bypass bore.

16. The venturi pump assembly of claim 14 wherein said throughbore and said venturi throat are formed by an internal wall of said housing, and wherein said bypass comprises a separate bypass bore extending through said internal wall of said housing.

17. The venturi pump assembly of claim 16 wherein said bypass closure member comprises a spring-biased ball valve located within said bypass bore.

18. The venturi pump assembly of claim 14 wherein said bypass comprises a separate bypass bore extending through said housing.

19. The venturi pump assembly of claim 18 wherein said bypass bore has a rectangular cross-section, and wherein said closure member comprises a spring-biased, pivotable closure strip extending across said bypass bore.

20. The venturi pump assembly of claim 14 wherein said venturi throat is a first venturi throat, and further comprising a second venturi throat within said throughbore downstream of said first venturi throat.

21. The venturi pump assembly of claim 20 wherein said second venturi throat is formed by said bypass closure member.

22. A venturi pump assembly for a liquid fuel vapor recovery hose assembly having an inner hose through which liquid fuel is pumped from a fuel supply tank by a fuel pump at the upstream end of the inner hose to a dispensing nozzle at the downstream end of the inner hose, and said hose assembly further comprising a vapor return passage between said inner hose and an outer hose connected to said fuel pump and to said nozzle and an evacuation fuel return tube located in said vapor return passage through which liquid fuel condensed and accumulated in said vapor return passage may be sucked into the venturi pump and thereby into said inner hose, said venturi pump assembly comprising:

a rigid housing having a throughbore and having an upstream, fuel inlet end and a downstream, fuel outlet end;

a venturi throat within said throughbore through which fuel can flow from its upstream end to its downstream end;

at least one passageway extending from said throat to said evacuation tube;

a bypass around said venturi throat through which fuel can flow; and a bypass closure member substantially preventing the flow of fuel through said bypass at lower fuel pumping rates but permitting the flow of fuel through said bypass in response to higher fuel pumping rates;

wherein said venturi throat is formed by a venturi tube, wherein said closure member comprises a spring-biased bypass tube slidably mounted with respect to said venturi tube, and wherein said bypass comprises mutually-cooperating surfaces of said bypass tube and said venturi tube.

23. A method for recovering liquid fuel vapors in a liquid fuel hose assembly, said hose assembly having an inner hose through which liquid fuel is pumped from a fuel supply tank by a fuel pump at the upstream end of the inner hose to a dispensing nozzle at the downstream end of the inner hose, and said hose assembly further comprising a vapor return passage between said inner hose and an outer hose connected to said fuel pump and to said nozzle and an evacuation fuel return tube located in said vapor return passage through which liquid fuel condensed and accumulated in said vapor return passage may be sucked into the venturi pump and thereby into said inner hose, said method comprising:

providing a venturi pump assembly through which said liquid fuel pumped from said fuel supply tank flows, said venturi pump assembly having (a) at least one primary fuel passageway providing a venturi throughbore having a venturi throat and a venturi passageway extending from said venturi throat to said evacuation tube, and (b) a bypass fuel passageway;

at lower fuel pumping rates, flowing fuel only through said at least one primary fuel passageway; and as the fuel pumping rate increases, permitting fuel to flow through said at least one bypass fuel passageway as well as through said at least one primary fuel passageway.

24. A venturi pump assembly for liquid recovery, comprising:

a rigid housing having a throughbore and having an upstream, liquid inlet end and a downstream, liquid outlet end;

a venturi throat within said throughbore through which liquid can flow from its upstream end to its downstream end;

at least one venturi passageway extending from said throat;

a bypass within said housing around said venturi throat through which liquid can flow; and a bypass closure member substantially preventing thee flow of liquid through said bypass at lower liquid pumping rates but permitting the flow of liquid through said bypass in response to higher liquid pumping rates.

25. The venturi pump assembly of claim 24 wherein said venturi throat is a first venturi throat, and further comprising a second venturi throat within said throughbore downstream of said first venturi throat.

26. The venturi pump assembly of claim 25 wherein said second venturi throat is formed by said bypass closure member.

* * * * *